United States Patent
Asai et al.

(10) Patent No.: US 12,147,126 B2
(45) Date of Patent: Nov. 19, 2024

(54) LIQUID CRYSTAL DISPLAY PANEL, ELECTRONIC DEVICE, AND MANUFACTURING METHOD FOR LIQUID CRYSTAL DISPLAY PANEL

(71) Applicant: Sharp Display Technology Corporation, Kameyama (JP)

(72) Inventors: Yoshihiro Asai, Kameyama (JP); Isao Ogasawara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 37 days.

(21) Appl. No.: 18/203,179

(22) Filed: May 30, 2023

(65) Prior Publication Data
US 2024/0004242 A1  Jan. 4, 2024

(30) Foreign Application Priority Data
Jul. 1, 2022  (JP) .................. 2022-106894

(51) Int. Cl.
*G02F 1/1339* (2006.01)
*G02F 1/1337* (2006.01)

(52) U.S. Cl.
CPC ........ *G02F 1/13394* (2013.01); *G02F 1/1337* (2013.01); *G02F 1/13396* (2021.01)

(58) Field of Classification Search
CPC ............. G02F 1/13394; G02F 1/13396; G02F 1/1337; G02F 1/13312; G06F 1/1686
See application file for complete search history.

(56) References Cited

U.S. PATENT DOCUMENTS

| | | | |
|---|---|---|---|
| 2012/0206669 A1 | 8/2012 | Kim et al. | |
| 2013/0258234 A1* | 10/2013 | Park ................ | G02F 1/133528 349/58 |
| 2015/0241732 A1 | 8/2015 | Kim et al. | |
| 2021/0349344 A1* | 11/2021 | Koito .................. | H04N 23/00 |

FOREIGN PATENT DOCUMENTS

JP  2012168506 A  9/2012

* cited by examiner

*Primary Examiner* — Angela M Medich
*Assistant Examiner* — Angela Davison
(74) *Attorney, Agent, or Firm* — ScienBiziP, P.C.

(57) ABSTRACT

A liquid crystal display panel includes: an array substrate; a counter substrate; a liquid crystal layer located between the array substrate and the counter substrate; and an alignment film formed on a surface facing the liquid crystal layer in each of the array substrate and the counter substrate. In a plan view, the liquid crystal display panel includes a display region, a non-display region adjacent to the display region, and a light-transmitting region located in the non-display region. At least one of the array substrate or the counter substrate includes a wall portion surrounding the light-transmitting region in the non-display region of the surface facing the liquid crystal layer, and the alignment film is not formed in a range surrounded by the wall portion.

18 Claims, 13 Drawing Sheets

LIQUID CRYSTAL DISPLAY PANEL, ELECTRONIC DEVICE, AND MANUFACTURING METHOD FOR LIQUID CRYSTAL DISPLAY PANEL

CROSS-REFERENCE TO RELATED APPLICATIONS

This application claims the benefit of priority to Japanese Patent Application Number 2022-106894 filed on Jul. 1, 2022. The entire contents of the above-identified application are hereby incorporated by reference.

BACKGROUND

Technical Field

The disclosure relates to a liquid crystal display panel, an electronic device, and a manufacturing method for the liquid crystal display panel.

Electronic devices such as notebook computers, smartphones, and tablet terminals equipped with a camera function are widely used. In particular, with the spread of new ways of working, such as telework and remote work, an electronic device capable of capturing an image on a display screen side to be usable for a web conference or the like is awaited.

On the other hand, such a portable device preferably has a narrow frame of a screen from a viewpoint of design. Thus, an arrangement of a camera and a liquid crystal display panel may have certain restrictions. JP 2012-168506 A discloses a display device in which a camera is disposed in a non-display region of a liquid crystal display panel.

SUMMARY

An object of the disclosure is to provide a liquid crystal display panel in which a camera can be disposed in a non-display region, an electronic device, and a manufacturing method for the liquid crystal display panel.

A liquid crystal display panel according to an embodiment of the disclosure includes: an array substrate; a counter substrate; a liquid crystal layer located between the array substrate and the counter substrate; and a seal located surrounding at least the liquid crystal layer between the array substrate and the counter substrate. The liquid crystal display panel includes a display region partitioned in a thickness direction, a non-display region adjacent to the display region, and a light-transmitting region located in the non-display region. At least one of the array substrate or the counter substrate includes a wall portion surrounding the light-transmitting region in the non-display region of a surface facing the liquid crystal layer.

An embodiment of the disclosure provides a liquid crystal display panel in which a camera can be disposed in a non-display region, an electronic device, and a manufacturing method for the liquid crystal display panel.

BRIEF DESCRIPTION OF DRAWINGS

The disclosure will be described with reference to the accompanying drawings, wherein like numbers reference like elements.

DESCRIPTION OF EMBODIMENTS

Figure 1:
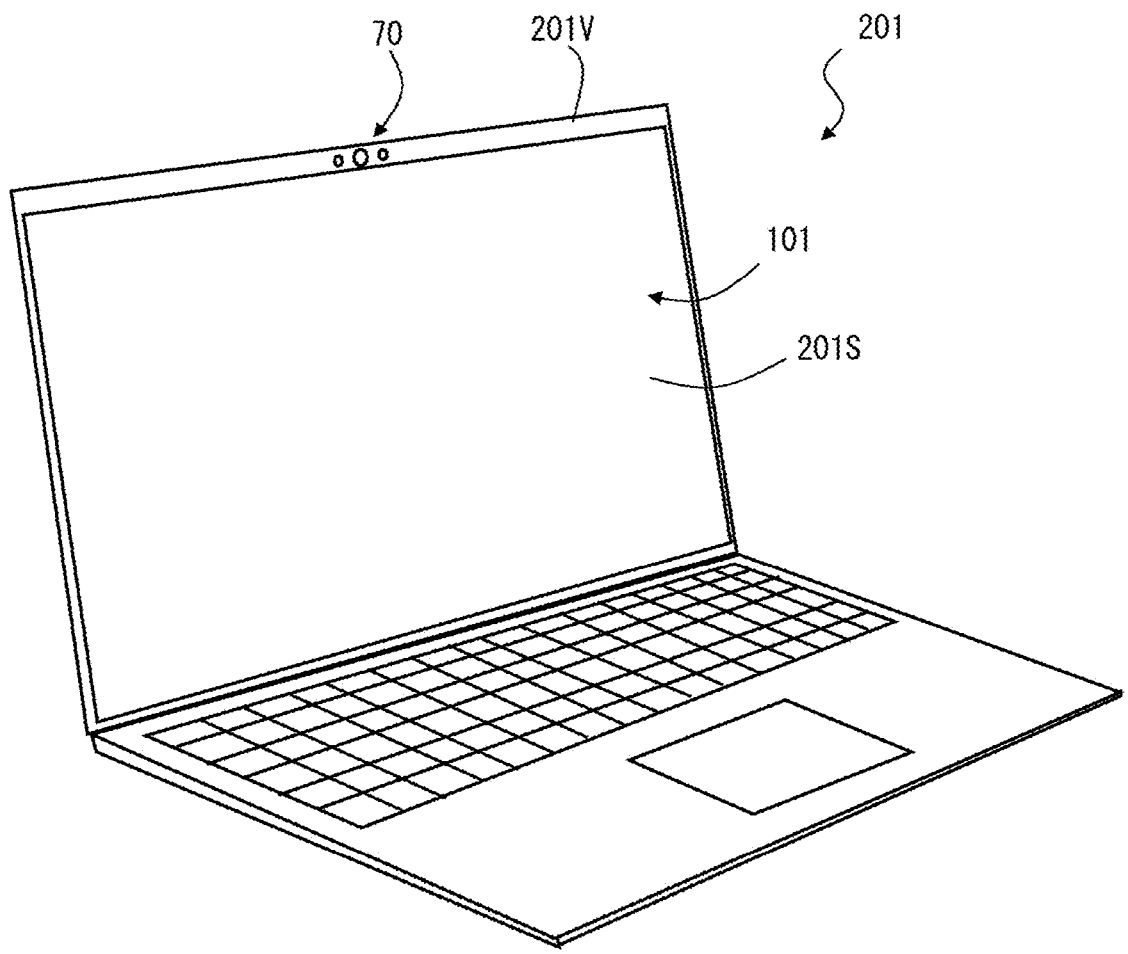
FIG. 1 is a schematic perspective view illustrating an example of an electronic device according to a first embodiment.

To narrow a frame around a screen of an electronic device and dispose a camera, disposing the camera in a non-display region of a liquid crystal display panel is considered as disclosed in JP 2012-168506 A. In this case, a region where light enters the camera (hereinafter referred to as a light-transmitting region) is close to a display region of the liquid crystal display panel.

As a result of consideration, the inventor of the present application has found that obtaining accuracy in separately patterning a fine region such as the light-transmitting region is difficult when an alignment film is applied by an ink-jet method in such a configuration and that the alignment film may also be applied to the light-transmitting region due to low viscosity of a material of the alignment film to be applied.

In view of such problems, the inventor of the present application has conceived a liquid crystal display panel having a novel structure, an electronic device, and a manufacturing method for the liquid crystal display panel.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 illustrates an appearance of a notebook computer 201 as an example of an electronic device according to the present embodiment. The notebook computer 201 includes a liquid crystal display panel 101 and a camera unit 70 inside. A display portion of the liquid crystal display panel 101 is located on a screen 201S. A frame 201V around the screen 201S is configured to be narrow from a viewpoint of aesthetics, and the camera unit 70 is disposed in the upper frame 201V.

Figure 2:
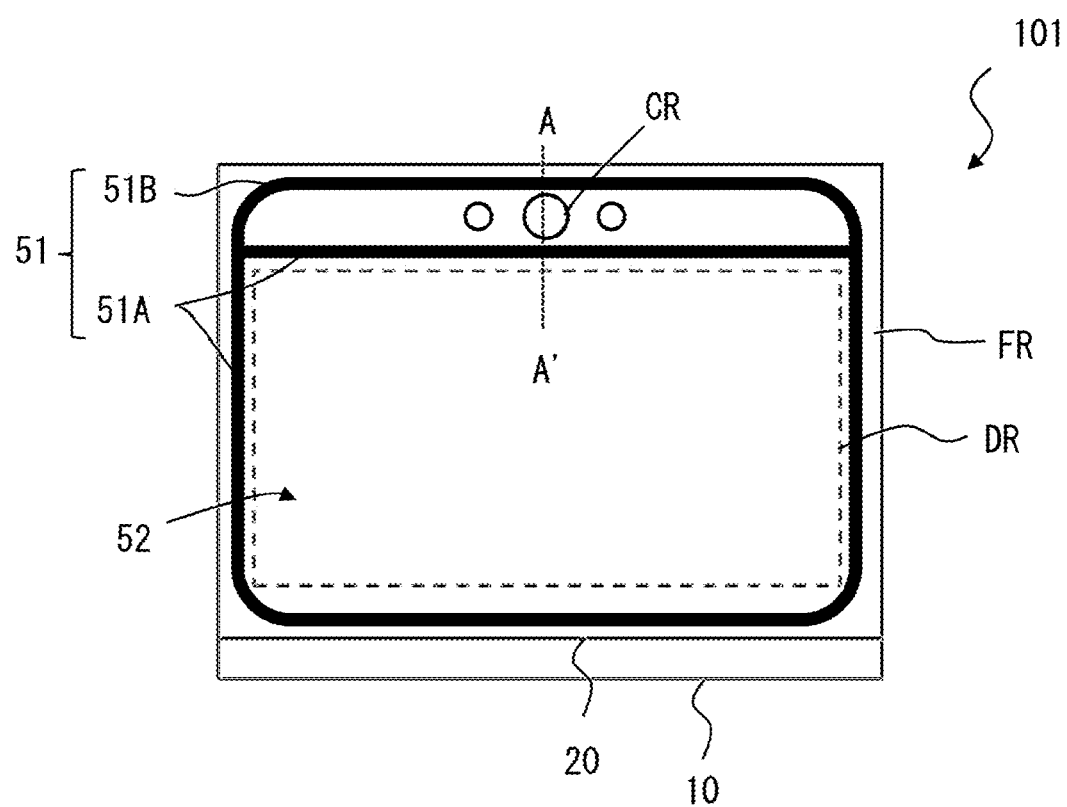
FIG. 2 is a schematic plan view illustrating an example of a liquid crystal display panel according to the first embodiment.
Figure 3:
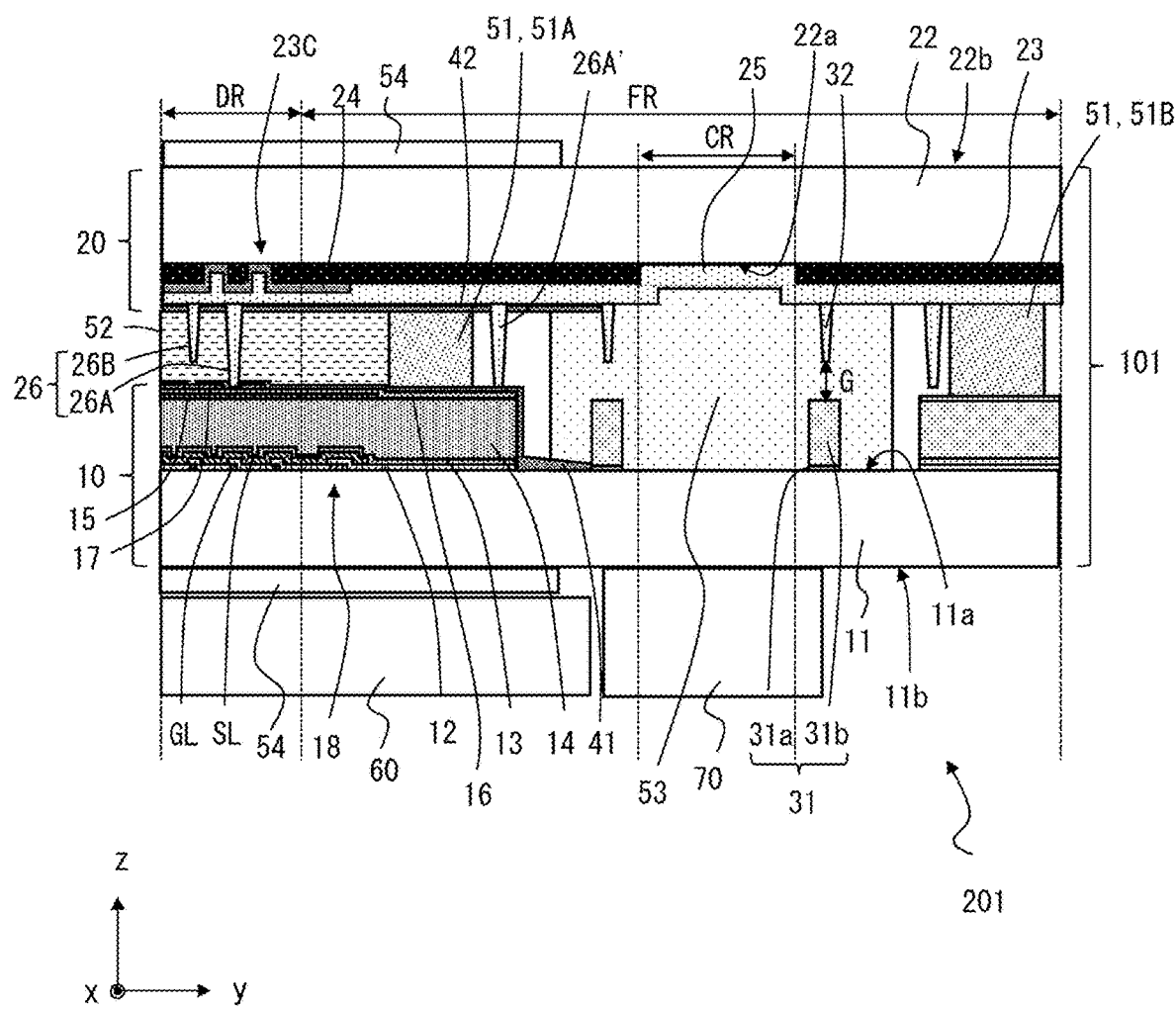
FIG. 3 is a schematic cross-sectional view of the electronic device and the liquid crystal display panel taken along a line A-A' in FIG. 2.

FIG. 2 is a plan view of the liquid crystal display panel 101. FIG. 3 is a cross-sectional view illustrating main components of the notebook computer 201 taken along a line A-A' in FIG. 2. FIG. 2 illustrates the portion A-A' enlarged for easy understanding.

The liquid crystal display panel 101 includes an array substrate 10, a counter substrate 20, a seal 51, and a liquid crystal layer 52. The array substrate 10 and the counter substrate 20 are disposed facing each other. The liquid crystal layer 52 is located between the array substrate 10 and the counter substrate 20, and the seal 51 is located surrounding the liquid crystal layer 52 between the array substrate 10 and the counter substrate 20.

Figure 4:
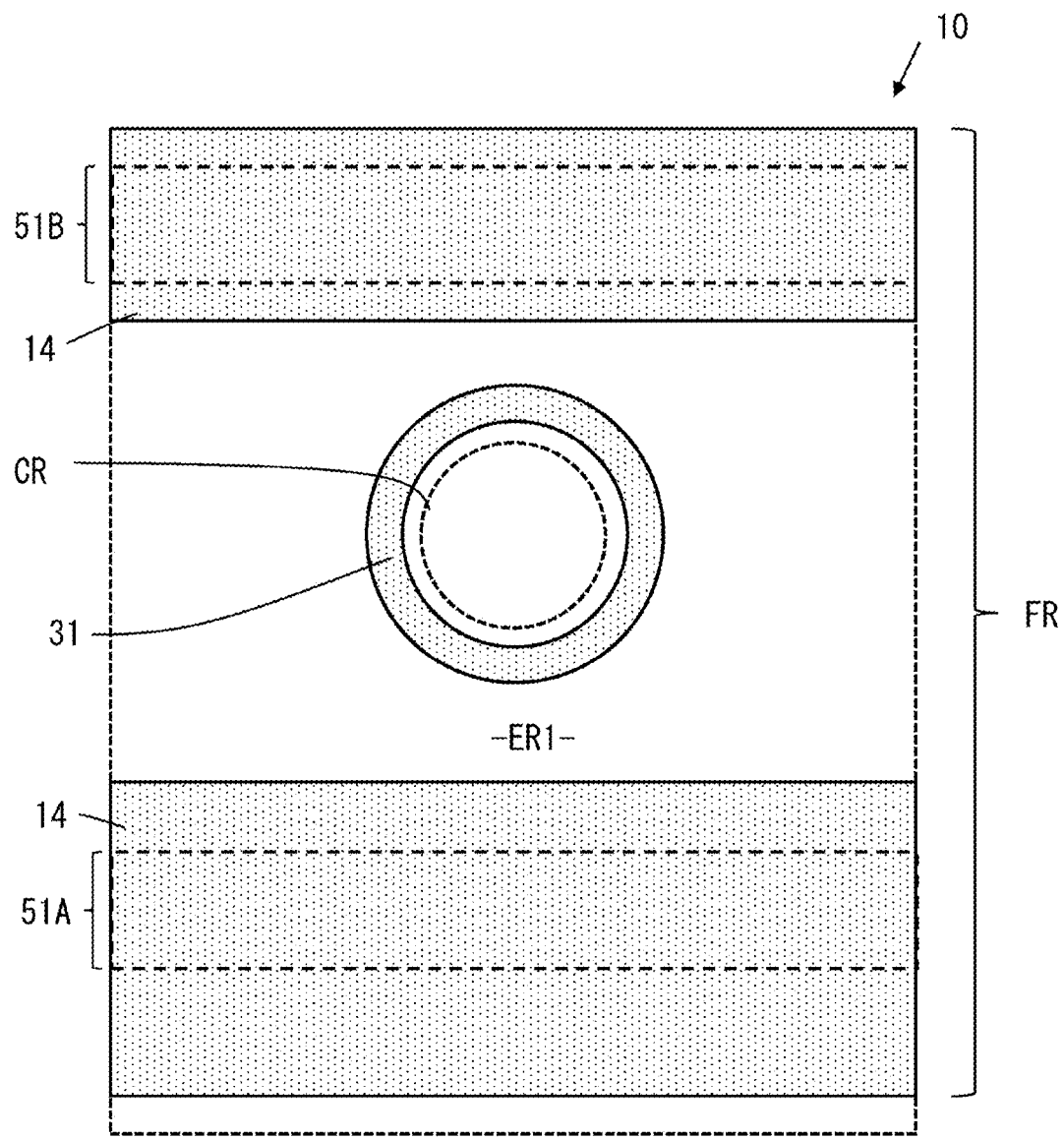
FIG. 4 is an enlarged plan view illustrating the vicinity of a light-transmitting region of an array substrate.
Figure 5:
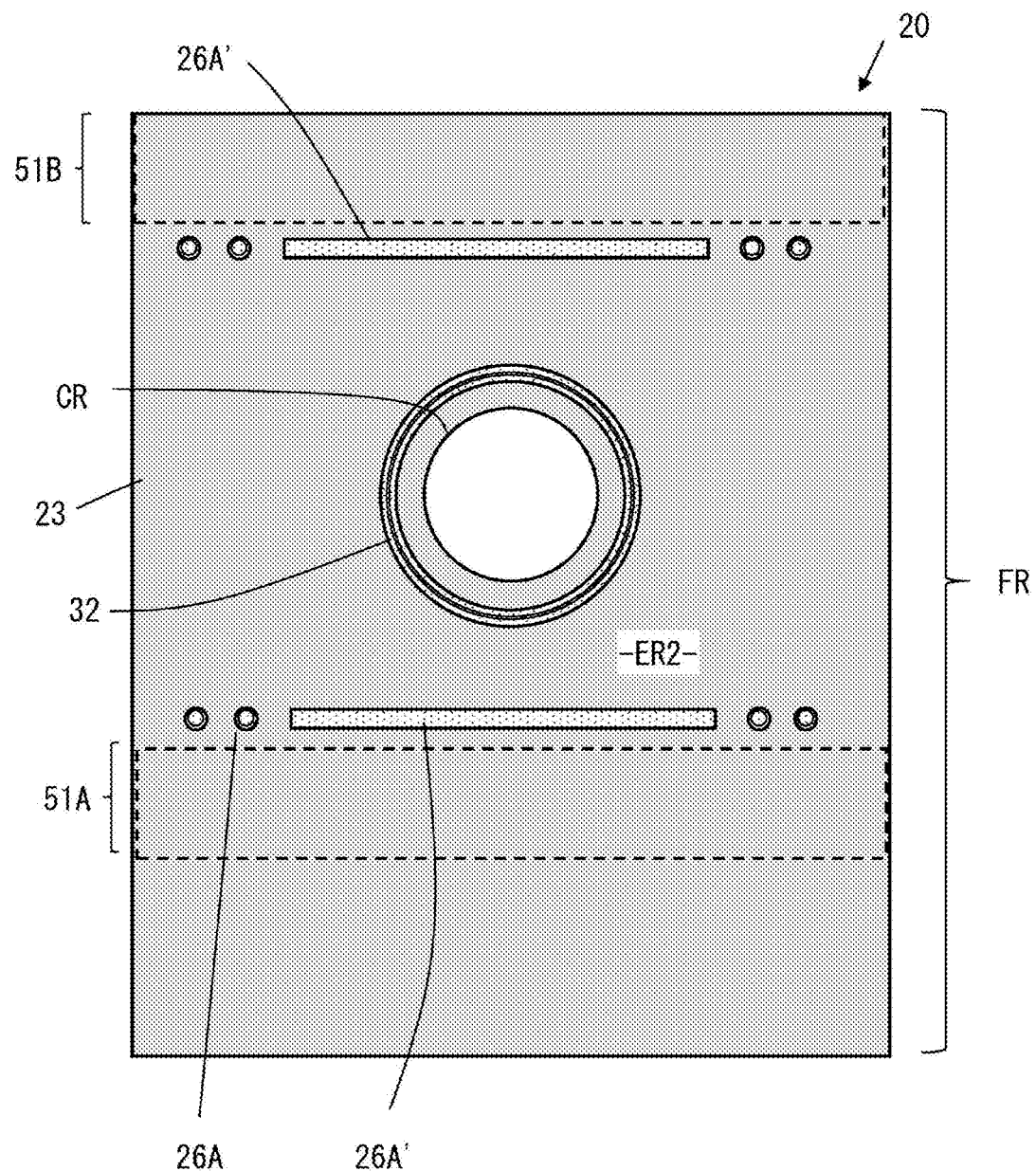
FIG. 5 is an enlarged plan view illustrating the vicinity of the light-transmitting region of a counter substrate.

As illustrated in FIG. 2, the liquid crystal display panel 101 includes, in a plan view, a display region DR where an image is displayed and a non-display region FR adjacent to the display region DR. The non-display region FR surrounds the display region DR. A light-transmitting region CR is included in the non-display region FR. As illustrated in FIG. 3, in the present description, the display region DR, the non-display region FR, and the light-transmitting region CR are partitioned (defined) in a thickness direction (z direction) of the liquid crystal display panel 101. Thus, each of the array substrate 10 and the counter substrate 20 also includes the display region DR, the non-display region FR, and the light-transmitting region CR. FIG. 4 and FIG. 5 are enlarged plan views illustrating the vicinity of the light-transmitting region CR of the array substrate 10 and the counter substrate 20 from which an alignment film is removed.

The display region DR is a region where an image is displayed in the liquid crystal display panel 101 and is a region where pixels are disposed in the array substrate 10. In the liquid crystal display panel 101, the non-display region FR is a region other than the display region DR. The light-transmitting region CR is located in the non-display region FR and is defined as, for example, an opening of a black matrix 23 disposed on the counter substrate 20 as described below. The light-transmitting region CR is a region serving as an optical path through which light enters the camera unit when the camera unit is disposed in the non-display region FR of the liquid crystal display panel 101.

The seal 51 is located between the array substrate 10 and the counter substrate 20 while surrounding the liquid crystal layer 52 at least disposed in the display region DR. In other words, the seal 51 is located in the non-display region FR. In the present embodiment, the seal 51 includes a first portion 51A surrounding the display region DR and a second portion 51B connected to the first portion 51A and surrounding a portion of the non-display region FR including the light-transmitting region CR.

As illustrated in FIG. 3, the notebook computer 201 further includes a pair of polarizers 54 and a backlight 60. The pair of polarizers 54 are located in the display region DR and part of the non-display region FR with the liquid crystal display panel 101 interposed therebetween. The backlight 60 is disposed facing the display region DR of the array substrate 10. The camera unit 70 is disposed facing the light-transmitting region CR of the array substrate 10.

The array substrate 10 includes a first substrate 11, a first wall 31, and a first alignment film 41. The array substrate 10 further includes a plurality of gate bus lines GL, a plurality of source bus lines SL, a plurality of pixels PX, and a first interlayer insulating film 14. First, a structure of the array substrate 10 in the display region DR will be described.

Figure 6:
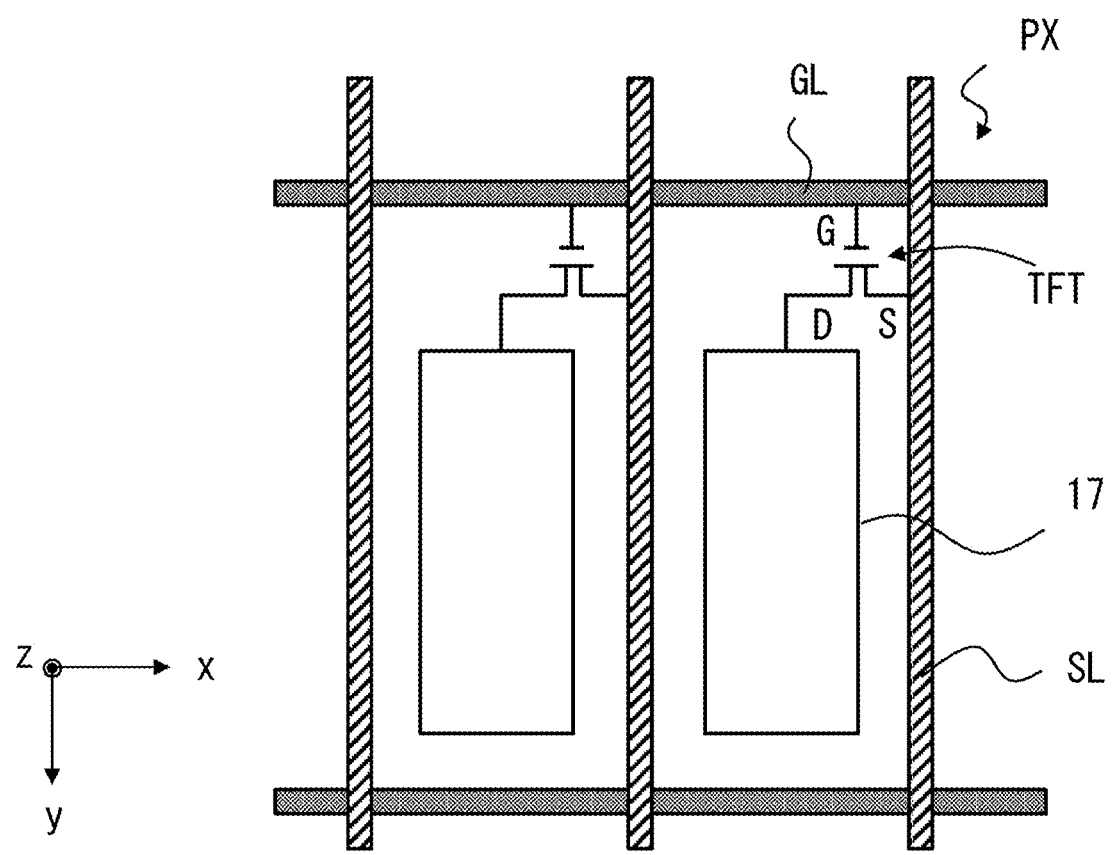
FIG. 6 is an enlarged schematic view illustrating main portions of an array structure.

The first substrate 11 is a transparent substrate including a first main surface 11a and a second main surface 11b located on a side opposite to the first main surface 11a and is, for example, a glass substrate. A TFT array structure for displaying an image is formed in the display region DR of the first main surface 11a of the first substrate 11. FIG. 6 is an enlarged schematic view illustrating main portions of the array structure.

For example, the plurality of gate bus lines GL extends in a first direction (x direction) and is disposed at predetermined intervals in a second direction (y direction). A gate insulating film 12 is formed on the first main surface 11a of the first substrate 11 while covering the plurality of gate bus lines GL, and the plurality of source bus lines SL is located on the gate insulating film 12. The plurality of source bus lines SL extends in the second direction and is disposed at predetermined intervals in the first direction. The gate bus lines GL and the source bus lines SL are made of, for example, metal such as titanium, aluminum, copper, molybdenum, and tungsten. The gate bus lines GL and the source bus lines SL may be a single layer consisting of such metal materials or may be a layered body having two or more layers. The gate insulating film 12 is made of, for example, silicon nitride, silicon oxide, or a layered film thereof.

In the plan view, the pixels PX are disposed in a plurality of respective regions surrounded by a pair of adjacent gate bus lines GL of the plurality of gate bus lines GL and a pair of adjacent source bus lines SL of the plurality of source bus lines SL. The plurality of pixels PX is two-dimensionally arrayed in the first direction and the second direction. Each of the pixels PX includes a TFT and a pixel electrode 17. A gate electrode G of the TFT is electrically connected to one of the pair of gate bus lines GL, and a source electrode S of the TFT is electrically connected to one of the pair of source bus lines SL. The pixel electrode 17 is connected to a drain electrode D of the TFT.

The TFT includes, for example, an oxide semiconductor layer containing at least one element selected from the group consisting of In, Ga, and Zn, or a Si semiconductor layer. The oxide semiconductor layer and the Si semiconductor layer may have various types of crystallinity such as polycrystal, microcrystal, or a c-axis orientation distribution. The pixel electrode 17 is made of, for example, a transparent conductive material such as ITO.

The present embodiment has no particular limitation on a driving method in a liquid crystal display panel, i.e., a structure for applying an electric field to a liquid crystal layer. A liquid crystal display panel that adopts various structures of a vertical electrical field mode or a transverse electrical field mode may be used.

In the example illustrated in FIG. 3, the liquid crystal display panel 101 is driven in the transverse electrical field mode. Thus, a common electrode 15 is disposed on the array substrate 10. Specifically, a protection film 13 is disposed on the gate insulating film 12 while covering the source bus line SL, and the first interlayer insulating film 14 is located on the protection film 13. The protection film 13 is made of, for example, an inorganic material such as silicon oxide, silicon nitride, and silicon oxynitride. The first interlayer insulating film 14 is a flattening film and is made of, for example, an organic material such as an acrylic resin.

The common electrode 15 is located on the first interlayer insulating film 14. The common electrode 15 covers the entire display region DR. The common electrode 15 is made of, for example, a transparent conductive material such as ITO.

A second interlayer insulating film 16 is located on the first interlayer insulating film 14 while covering the common electrode 15. The second interlayer insulating film 16 is made of, for example, an inorganic material such as silicon nitride. The pixel electrode 17 is located on the second interlayer insulating film 16.

The first alignment film 41 is located on the second interlayer insulating film 16. The first alignment film 41 is made of, for example, a polyimide resin.

Next, a structure of the array substrate 10 in the non-display region FR will be described. The first wall 31 surrounds the light-transmitting region CR in the non-display region FR of the surface of the array substrate 10 facing the liquid crystal layer 52, i.e., the first main surface 11a of the first substrate 11. The first alignment film 41 is not located in the region surrounded by the first wall 31.

Since the first wall 31 surrounds the light-transmitting region CR on the first main surface 11a, when the first alignment film 41 is formed, an uncured material of the applied first alignment film 41 can be suppressed from flowing into the light-transmitting region CR. In the present embodiment, the first wall 31 has a tubular shape in which an inner edge and an outer edge have circular shapes in the plan view. The first wall 31 includes a first portion 31a made of the same material as that of the protection film 13, and a second portion 31b made of the same material as that of the first interlayer insulating film 14.

The first wall 31 may include a member other than the first portion 31a and the second portion 31b. For example, a member that can be formed by the same step as that of the member formed in the display region DR of the array substrate 10 may be included. Specifically, the first wall 31 may further include, for example, a member made of the same material as that of the gate insulating film 12 and/or a member made of the same material as that of the second interlayer insulating film 16. Further, the first wall 31 does not need to include the first portion 31a. On the other hand, the first wall 31 preferably includes at least the second portion 31b. The first interlayer insulating film 14 made of the same material as that of the second portion 31b is formed to be thicker (1 μm to 4 μm) than other members. Thus, the first wall 31 includes the second portion 31b, and thus the relatively high first wall 31 can be formed, and the material of the first alignment film 41 can be more reliably suppressed from flowing into the light-transmitting region CR.

The first wall 31 may be formed in a step different from the step of forming the display region DR of the array substrate 10, or may be made of a material different from that of a member formed in the display region DR. From a viewpoint of shortening a manufacturing time and suppressing a manufacturing cost, the first wall 31 preferably includes a member that can be formed by the same material as that of the member formed in the display region DR and the same step.

Among the components formed in the display region DR of the array substrate 10, the gate insulating film 12, the protection film 13, the first interlayer insulating film 14, and the second interlayer insulating film 16 preferably extend to the non-display region FR. More specifically, in the non-display region FR, the gate insulating film 12, the protection film 13, the first interlayer insulating film 14, and the second interlayer insulating film 16 are preferably layered in the region where the seal 51 is located. In the non-display region FR, an ESD protection element, an element other than a pixel, such as an inspection circuit, and a circuit 18 may be formed.

Further, a region ER1 where the first interlayer insulating film 14 is not formed is preferably located around the first wall 31 in the plan view. Not disposing the first interlayer insulating film 14 in the region ER1 allows, when an uncured material of the first alignment film 41 is applied onto the second interlayer insulating film 16 in the display region DR, the material of the first alignment film 41 that flows and spreads to be accumulated in the region ER1. Not disposing the first interlayer insulating film 14 in the region ER1 allows a space to have a sufficient size to store the material of the first alignment film 41.

Next, a structure of the counter substrate 20 will be described. The counter substrate 20 includes a second substrate 22, the black matrix 23, a color filter 24, and a second alignment film 42. The counter substrate 20 includes an overcoat film 25 and a plurality of spacers 26.

The second substrate 22 is a transparent substrate including a first main surface 22a and a second main surface 22b located on a side opposite to the first main surface 22a and is, for example, a glass substrate. The black matrix 23 is disposed in the display region DR of the first main surface 22a of the second substrate 22 and the non-display region FR other than the light-transmitting region CR. In other words, the black matrix 23 has an opening defined by the light-transmitting region CR in the non-display region FR. The black matrix 23 is made of, for example, a resin material that hardly transmits light, such as a black resin, a single-layer metal film of chromium or the like, or a layered structure of a metal layer and a layer consisting of a metal oxide.

In the display region DR of the black matrix 23, a plurality of openings 23C disposed in positions corresponding to the plurality of pixels PX is formed. The color filter 24 is disposed in the opening 23C and on the black matrix 23. The color filter 24 is made of, for example, a photosensitive resin material such as a color resist.

The overcoat film 25 is located on the black matrix 23 and in the light-transmitting region CR while covering the color filter 24. The overcoat film 25 is made of, for example, a resin material such as an epoxy resin.

The second alignment film 42 is disposed on the overcoat film 25. The second alignment film 42 is made of, for example, a polyimide resin.

The plurality of spacers 26 is disposed on the display region DR of the overcoat film 25. In the present embodiment, the plurality of spacers 26 includes a plurality of main spacers 26A and a plurality of sub-spacers 26B. A height of the sub-spacer 26B is smaller than a height of the main spacer 26A. In a normal state, the main spacer 26A is in contact with the array substrate 10 to define a gap between the array substrate 10 and the counter substrate 20. The spacer 26 can be made of, for example, a photoresist.

Similar to the array substrate 10, a second wall 32 is located in the non-display region FR of the counter substrate 20. Specifically, the second wall 32 surrounds the light-transmitting region CR in the non-display region FR of the surface of the counter substrate 20 facing the liquid crystal layer 52, i.e., the first main surface 22a of the second substrate 22. The second alignment film 42 is not located in the region surrounded by the second wall 32.

Since the second wall 32 surrounds the light-transmitting region CR on the first main surface 22a, when the second alignment film 42 is formed, an uncured material of the applied second alignment film 42 can be suppressed from flowing into the light-transmitting region CR. In the present embodiment, the second wall 32 has a tubular shape in which an inner edge and an outer edge have circular shapes in the plan view. A cross section passing through an axis of the tubular shape of the second wall 32 has a trapezoidal shape. The second wall 32 preferably overlaps the first wall 31 in the plan view. Further, a gap G is preferably formed between the second wall 32 and the first wall 31 in the thickness direction of the liquid crystal display panel 101. In other words, it is preferable that a tip of the second wall 32 and a tip of the first wall 31 are not in contact with each other. For example, the second wall 32 may have a height equal to that of the sub-spacer 26B.

The second wall 32 may be made of the same material as that of the spacer 26. In this case, the second wall 32 can be formed simultaneously with the sub-spacer 26B in the step of forming the sub-spacer 26B by using the same material as that of the spacer 26.

The counter substrate 20 may include, in the non-display region FR, a spacer 26A' disposed between the second wall 32 and each of a first portion 51A and a second portion 51B of the seal 51. The spacer 26A' has, for example, a wall shape extending in parallel with the first portion 51A and the second portion 51B of the seal 51. A height of the spacer 26A' may be, for example, the same as a height of the main spacer 26A. Further, for example, the main spacers 26A may sandwich the spacer 26A' in the plan view.

In the plan view, it is preferable that the second wall 32 is separated from a region in contact with the first portion 51A and the second portion 51B of the seal 51, and a region ER2 is located between the region in contact with the first portion 51A and the second portion 51B of the seal 51 and the second wall 32. The region ER2 is a region where the uncured material of the second alignment film 42 may spread.

As described above, the array substrate 10 and the counter substrate 20 are sealed by the seal 51. The liquid crystal layer 52 is located in a region surrounded by the first portion 51A of the seal 51. The liquid crystal layer 52 is not located in the light-transmitting region CR. Thus, transmittance in the light-transmitting region CR is increased.

The liquid crystal display panel 101 may further include a transparent resin portion 53 disposed in the light-transmitting region CR between the array substrate 10 and the counter substrate 20. The transparent resin portion 53 is provided to adjust a refractive index in the light-transmitting region CR. When an air layer is located between the array substrate 10 and the counter substrate 20 in the light-transmitting region CR, light incident on the liquid crystal display panel 101 from the outside may spread in the light-transmitting region CR, which is an optical path of the camera unit 70, due to a great refractive index difference at an interface between the air layer and the array substrate 10/the counter substrate 20, and it may be difficult to efficiently cause the incident light to be incident on the camera unit 70. Thus, the transparent resin portion 53 having a refractive index greater than that of the air layer is disposed between the array substrate 10 and the counter substrate 20.

From such a viewpoint, the transparent resin portion 53 is preferably made of a transparent resin having a refractive index greater than 1, and in particular, preferably made of a transparent resin having a small refractive index difference from a refractive index of the glass constituting the first substrate 11 and the second substrate 22. It is preferable that the transparent resin portion 53 is not in contact with air in the light-transmitting region CR between the array substrate 10 and the counter substrate 20. It is preferable that the first wall 31 and the second wall 32 are in contact with the transparent resin portion 53.

To dispose the transparent resin portion 53 without air in the light-transmitting region CR, for example, at the time of manufacturing the liquid crystal display panel 101, a greater amount of an uncured material of the transparent resin portion 53 than a volume of the light-transmitting region CR between the array substrate 10 and the counter substrate 20 is disposed in a region including the light-transmitting region CR, and the array substrate 10 and the counter substrate 20 are bonded to each other to cure the uncured material of the transparent resin portion 53. At this time, the excessive uncured material is pushed out from the gap G between the second wall 32 and the first wall 31 to the outside of the light-transmitting region CR. Thus, formation of an air layer in the light-transmitting region CR is suppressed. Further, the first wall 31 and the second wall 32 can cause the uncured material of the transparent resin portion 53 to stay within the light-transmitting region CR to some extent and suppress excessive spread of the uncured material at the time of manufacturing.

The uncured material of the transparent resin portion 53 pushed out to the outside of the light-transmitting region CR accumulates in the region ER on the array substrate 10 side and is thus suppressed from coming into contact with the seal 51. On the counter substrate 20 side, the spacers 26A' cause the uncured material of the transparent resin portion 53 to come into contact with the seal 51 or to come into contact with and push away an uncured material of the seal 51, and thus narrowing of a width of the seal 51 can be suppressed.

Figure 7:
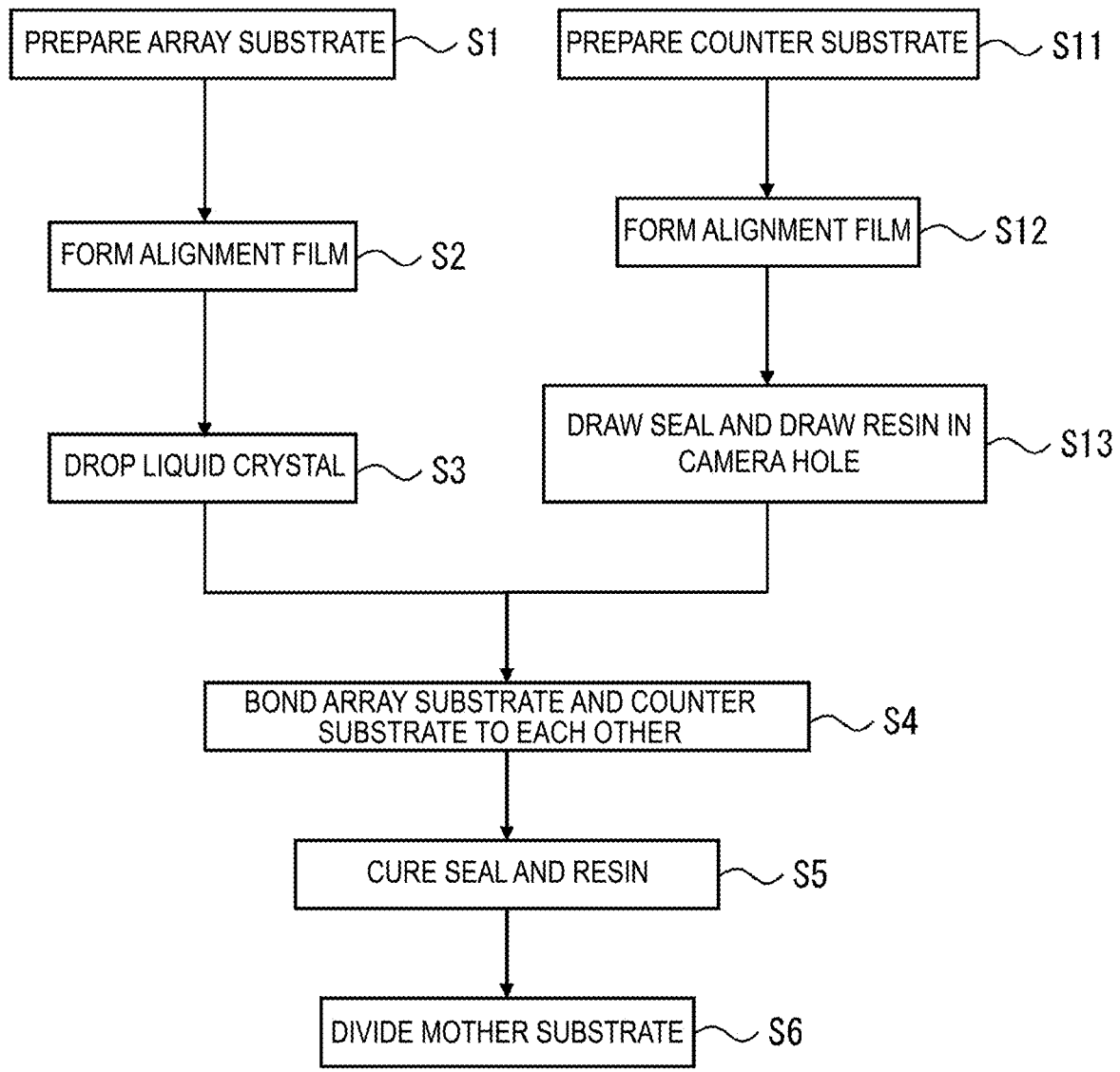
FIG. 7 is a flowchart illustrating a manufacturing method for the liquid crystal display panel according to the first embodiment.

Next, an example of a manufacturing method for the liquid crystal display panel 101 according to the present embodiment will be described with reference to FIG. 3 and FIG. 7. FIG. 7 is a flowchart illustrating the manufacturing method for the liquid crystal display panel 101 according to the present embodiment.

The manufacturing method for the liquid crystal display panel 101 according to the present embodiment includes a step (S1) of preparing the array substrate 10, a step (S11) of preparing the counter substrate 20, a step (S2) of forming the first alignment film 41, a step (S12) of forming the second alignment film 42, a step (S13) of drawing a sealing material and a resin material, a step (S3) of dropping a liquid crystal onto the array substrate, a step (S4) of bonding the array substrate and the counter substrate to each other, and a step (S5) of curing the sealing material and the resin material. The method further includes a step (S6) of dividing the substrate.

(1) Step (S1) of Preparing Array Substrate 10 and Counter Substrate 20

First, the array substrate 10 on which the first alignment film 41 is not formed is prepared. The array substrate 10 is prepared as a mother substrate including a plurality of the array substrates 10 connected. The array substrate 10 can be prepared by using a general manufacturing method for a liquid crystal display panel. In the first wall 31 of the array substrate 10, the first portion 31A can be formed in the same step as the formation of the protection film 13, and the second portion 31B can be formed in the same step as the formation of the first interlayer insulating film 14. The step forms the array substrate 10 that includes the display region DR and the non-display region FR adjacent to the display region DR and including the light-transmitting region CR and includes the first wall 31 surrounding the light-transmitting region CR formed in the non-display region FR.

(2) Step (S11) of Preparing Counter Substrate 20

Similar to the array substrate 10, the counter substrate 20 on which the second alignment film 42 is not formed is prepared. The counter substrate 20 is also prepared as a mother substrate including a plurality of the counter substrates 20 connected. The counter substrate 20 can also be prepared by using a general manufacturing method for a liquid crystal display panel. The second wall 32 of the counter substrate 20 can be prepared in the same step as the formation of the spacer 26. The step forms the counter substrate 20 that includes the display region DR and the non-display region FR adjacent to the display region DR and including the light-transmitting region CR and includes the second wall 32 surrounding the light-transmitting region CR in the non-display region FR.

(3) Step (S2) of Forming First Alignment Film 41

The first alignment film 41 is formed in the display region DR of the array substrate 10 by, for example, an ink-jet method. When an uncured material of the first alignment film 41 is applied, as described above, the first wall 31 can suppress the applied material from spreading to the light-transmitting region CR of the array substrate 10.

(3) Step (S12) of Forming Second Alignment Film 42

The second alignment film 42 is formed in the display region DR of the counter substrate 20 by, for example, an ink-jet method. When an uncured material of the second alignment film 42 is applied, as described above, the second wall 32 can suppress the applied material from spreading to the light-transmitting region CR of the counter substrate 20.

The steps S1, S2, S11, and S12 does not need to be performed in the above-described order. For example, the array substrate 10 and the counter substrate 20 may be prepared in the order of the steps S1, S2, S11, and S12. In other words, as long as the step S2 is performed after the step S1 and the step S12 is performed after the step S11, a temporal relationship between the steps S1 and S2 and the steps S11 and S12 is not limited to the temporal relationship described above.

(4) Step (S13) of Drawing Sealing Material and Resin Material

On the counter substrate 20, an uncured material of the seal 51 is drawn in positions to be the first portion 51A surrounding the display region DR and the second portion 51B connected to the first portion 51A and surrounding a portion including the light-transmitting region CR in the non-display region FR. Further, an uncured transparent resin material to be the transparent resin portion 53 is drawn in a region of the counter substrate 20 including the light-transmitting region CR. At this time, the second wall 32 suppresses the transparent resin material from spreading and coming into contact with the sealing material.

(5) Step (S3) of Dropping Liquid Crystal Onto Array Substrate

A liquid crystal is dropped in the display region DR of the array substrate 10. The step S3 may be performed before or simultaneously with the step S13.

(6) Step (S4) of Bonding Array Substrate and Counter Substrate to Each Other

The array substrate 10 and the counter substrate 20 are bonded to each other under vacuum.

(6) Step (S5) of Curing Sealing Material and Resin Material

The sealing material and the transparent resin material located between the bonded array substrate 10 and the counter substrate 20 are cured by heat, ultraviolet rays, or the like. At this time, the transparent resin material and the sealing material are not in contact with each other, thus suppressing a decrease in a width of the cured seal 51.

(7) Step (S6) of Dividing Substrate

Since the array substrate 10 and the counter substrate 20 are bonded to each other in the state of the mother substrate, the liquid crystal display panel 101 is completed by dividing the mother substrate.

According to the present embodiment, the liquid crystal display panel 101 includes the wall portion, that is, includes at least one of the first wall 31 or the second wall 32, and thus the first wall 31 or the second wall 32 functions as a wall that blocks the uncured material of the alignment film, the alignment film is formed in the light-transmitting region CR serving as the optical path of the camera unit, and a decrease in transmittance can be suppressed. Further, the region ER1 is located outside the first wall 31, and the region ER2 is located outside the second wall 32.

The region ER1 and the region ER2 allow the applied material to flow and spread when the uncured material of the alignment film is applied. When such a wall portion that blocks the uncured material of the alignment film is provided in the vicinity of the display region DR, the uncured material blocked by the wall portion remains in the vicinity of the outer edge of the display region, and a thickness of the alignment film to be formed increases in the vicinity of the outer edge of the display region. Further, when the wall portion is not provided and the application amount of the material is reduced such that the uncured material of the alignment film does not spread, a thickness of the alignment film to be formed is reduced in the vicinity of the outer edge of the display region.

Second Embodiment

Figure 8:
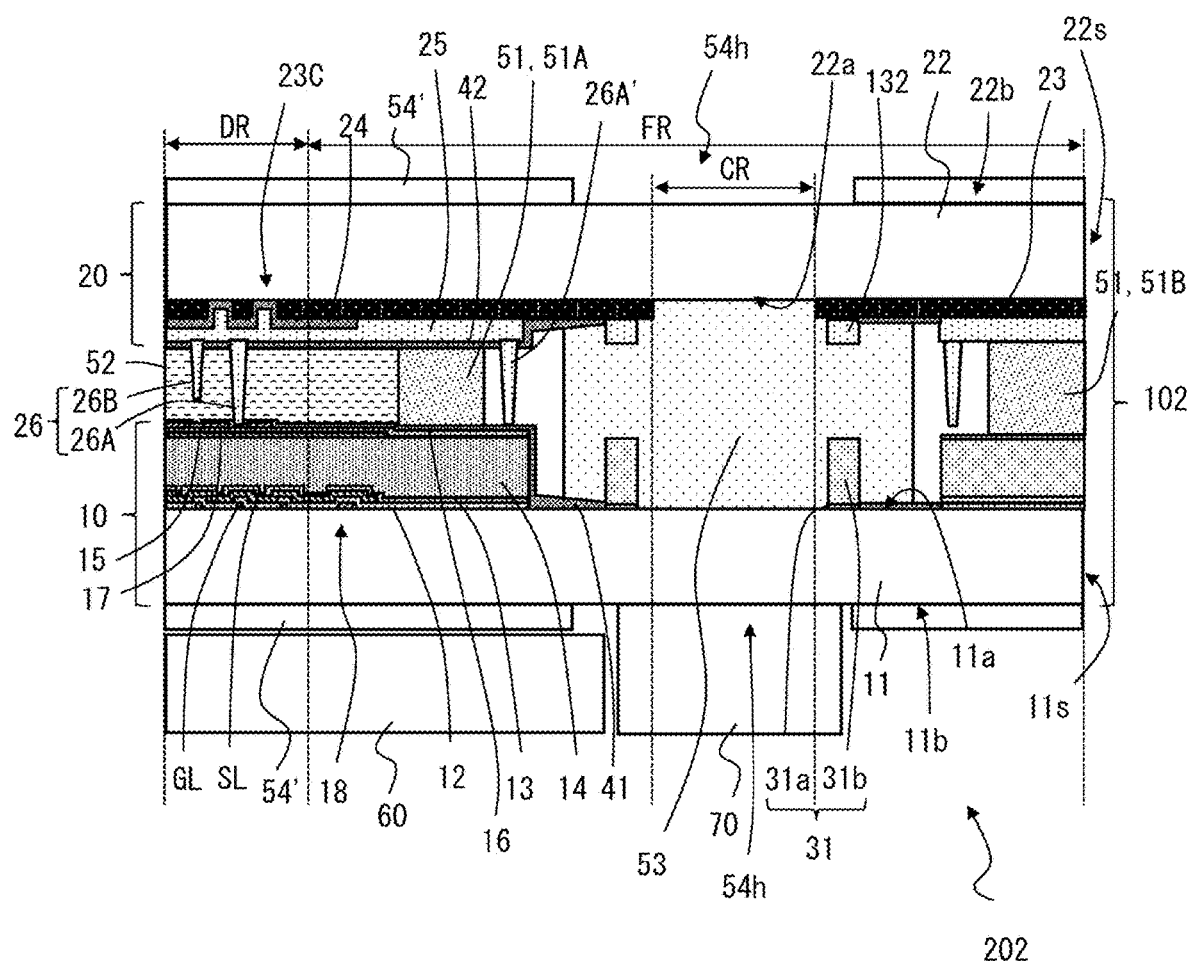
FIG. 8 is a schematic cross-sectional view of an electronic device and a liquid crystal display panel according to a second embodiment in a position corresponding to that in FIG. 3.

FIG. 8 illustrates a cross-sectional view of an electronic device and a liquid crystal display panel according to the present embodiment in a position corresponding to that in FIG. 3. A notebook computer 202 and a liquid crystal display panel 102 according to the present embodiment are different from the notebook computer 201 and the liquid crystal display panel 101 according to the first embodiment in that a second wall 132 is made of the same material as that of the overcoat film 25 and that the overcoat film 25 is not formed in the light-transmitting region CR. The transparent resin portion 53 is in direct contact with the second substrate 22.

In the first embodiment, the overcoat film 25 is formed in the entire display region DR and the entire non-display region FR, and the overcoat film 25 is not patterned. In contrast, in the present embodiment, the second wall 132 can be formed by applying the overcoat film 25 to the entire display region DR and the entire non-display region FR and then removing the overcoat film 25 in the regions corresponding to the light-transmitting region CR and the region ER2.

Further, in the liquid crystal display panel 102, a pair of polarizers 54' may be located in the entire display region DR and the entire non-display region FR and may each have a hole 54h in a position corresponding to the light-transmitting region CR. Furthermore, a seal 51 may be provided in an outer edge region of the non-display region FR so as to form the same plane as a side surface 11s of the first substrate 11 and a side surface 22s of the second substrate 22.

According to the liquid crystal display panel 102, the overcoat film 25 is not formed in the light-transmitting region CR, and thus transmittance in the light-transmitting region CR can be further increased. Further, a volume that can store a material of an alignment film in the region ER2 can be further increased.

In the liquid crystal display panel 102, the second wall 132 may further include a portion made of the same material as that of the color filter 24. Further, the second wall 132 may include the second wall 32 according to the first embodiment.

Other Embodiments

The electronic device and the liquid crystal display panel according to the disclosure are not limited to the above-described embodiments, and various modifications may be made.

Figure 9:
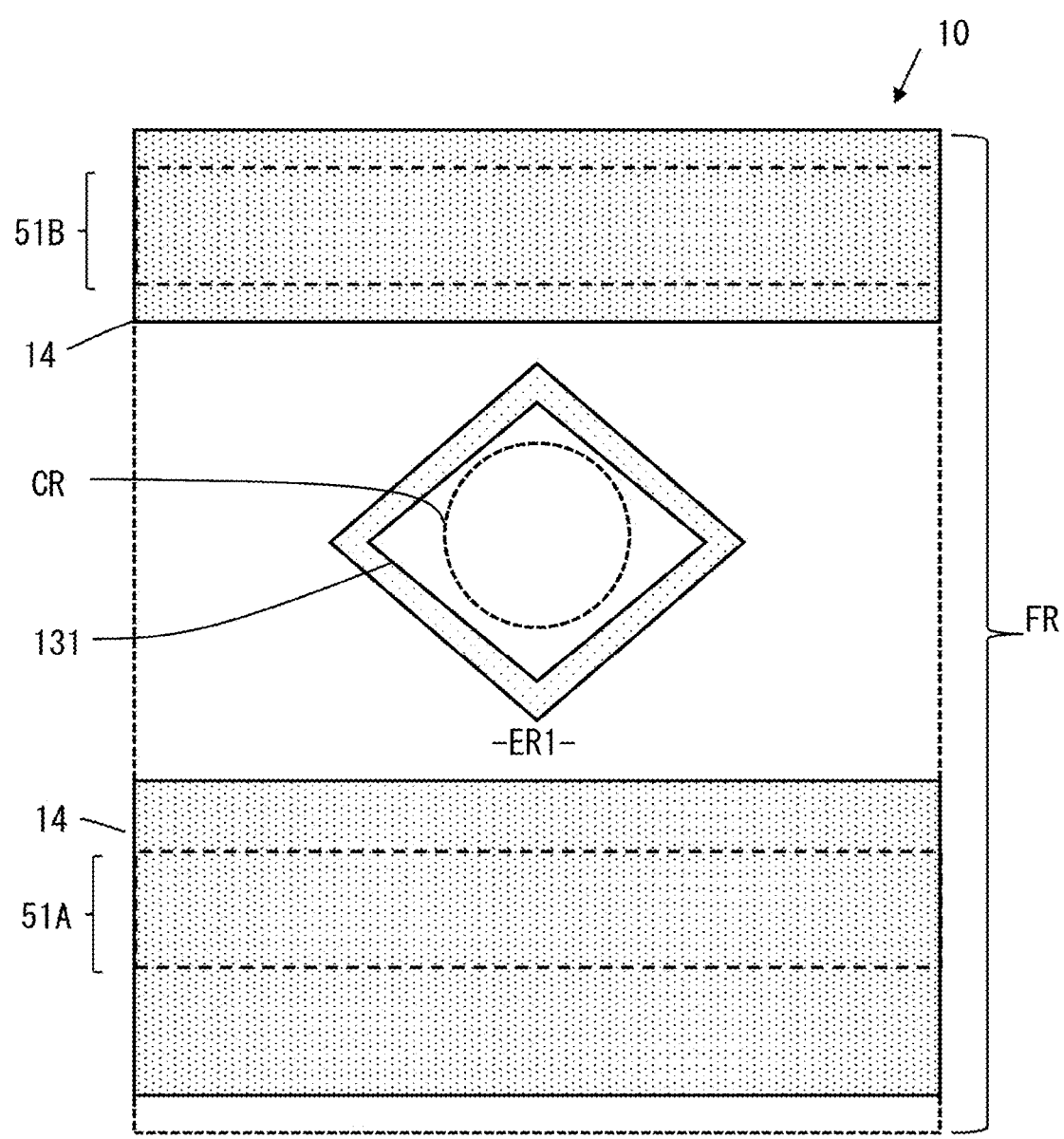
FIG. 9 is an enlarged plan view illustrating the vicinity of a light-transmitting region of an array substrate according to another embodiment.

For example, a shape of the first wall 31 and the second walls 32 and 132 is not limited to a tubular shape. For example, a shape of the first wall and/or the second wall in the plan view may be a polygon such as a triangle or a quadrangle. FIG. 9 illustrates an example in which a first wall 131 has a quadrangular outer edge and a quadrangular inner edge in the plan view. The inner edge and the outer edge are not limited to the same shape, the outer edge may be quadrangular, and the inner edge may be circular.

Figure 10:
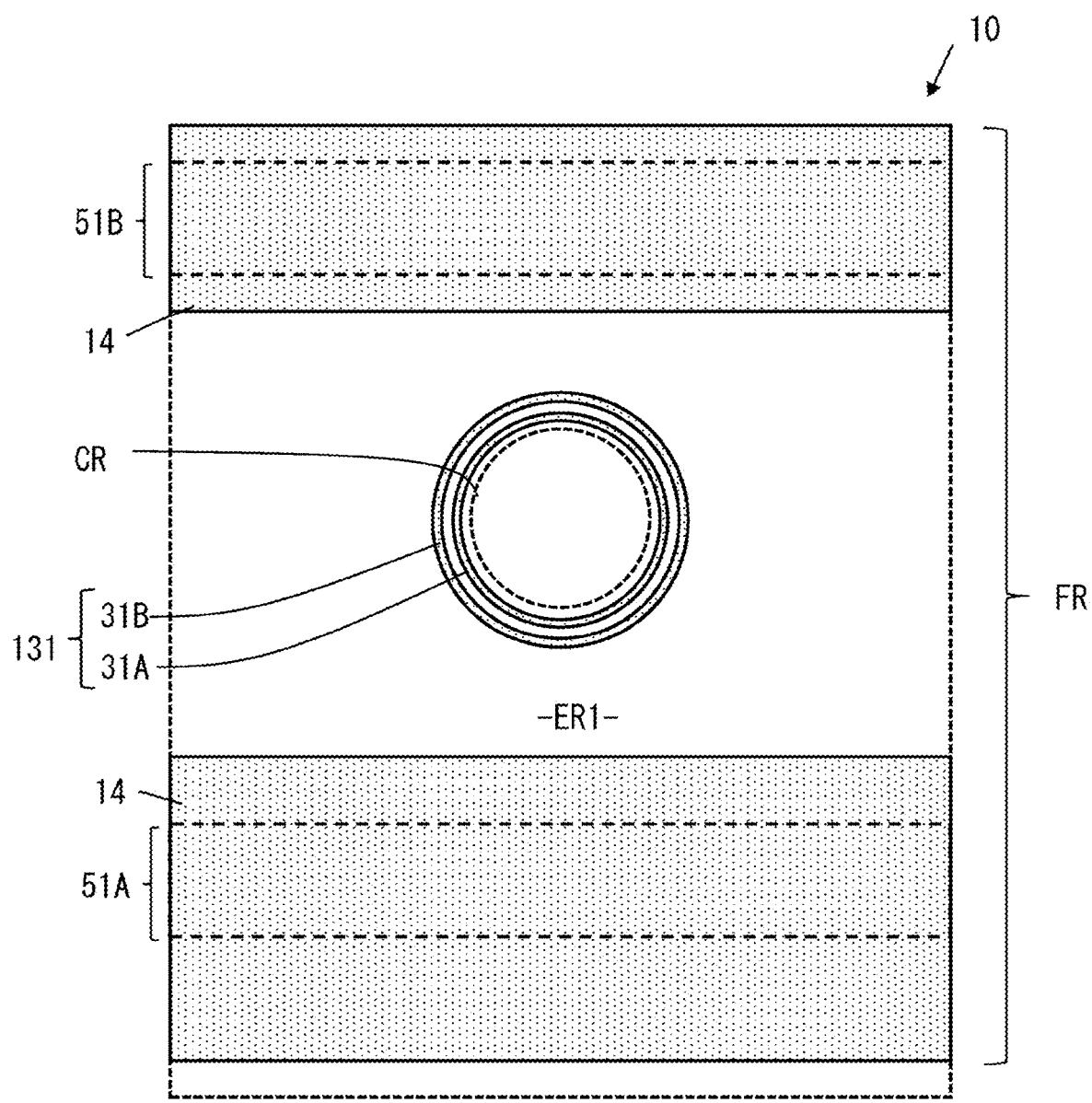
FIG. 10 is an enlarged plan view illustrating the vicinity of a light-transmitting region of an array substrate according to another embodiment.

At least one of the first wall or the second wall may be multiply formed in the plan view. For example, in FIG. 10, the first wall 131 includes an inner wall 31A surrounding the light-transmitting region CR, and an outer wall 31B surrounding the inner wall 31A outside the inner wall 31A. The inner wall 31A and the outer wall 31B each have circular outer and inner edges in the plan view.

Figure 11:
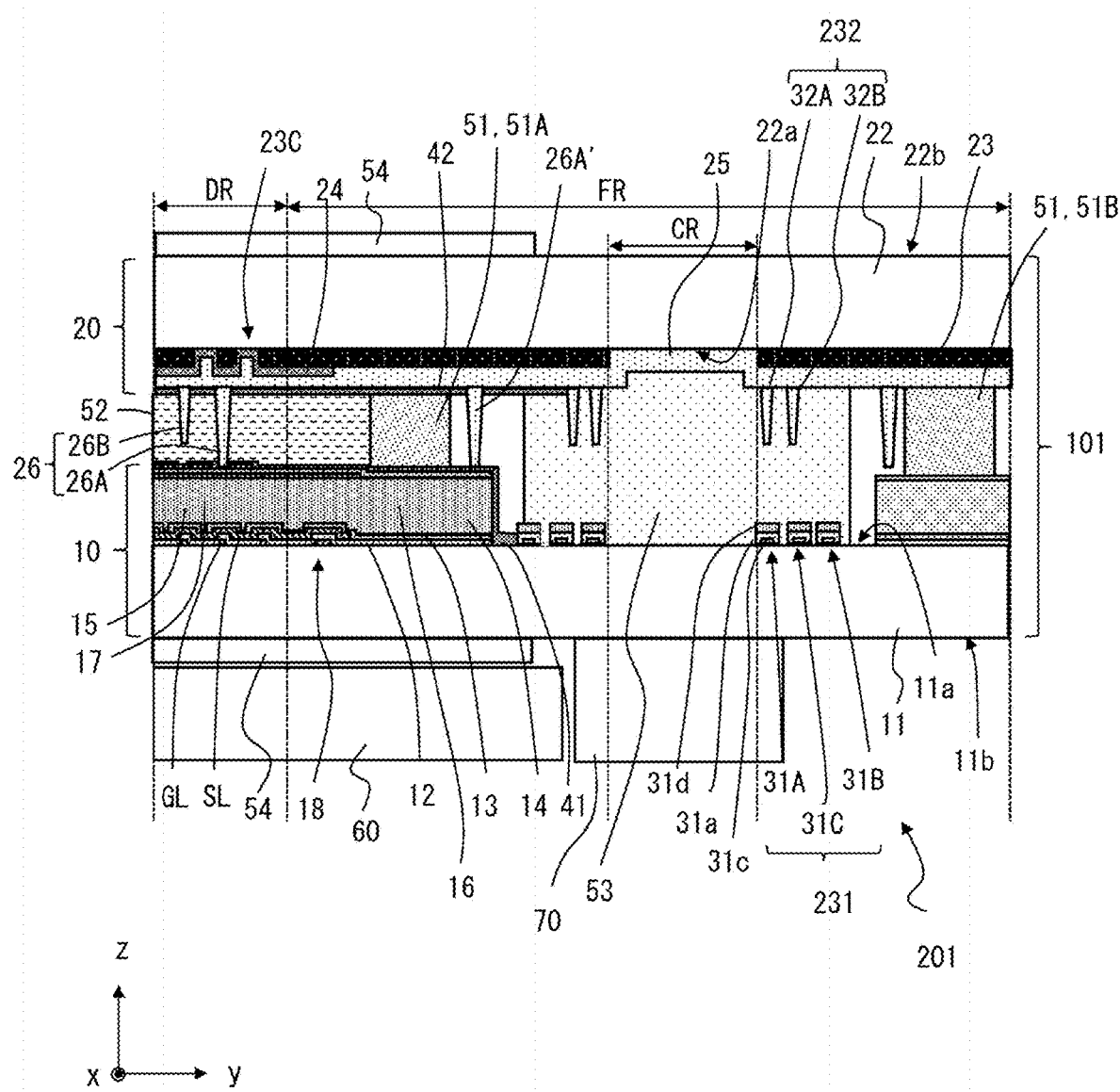
FIG. 11 is a schematic cross-sectional view of an electronic device and a liquid crystal display panel according to another embodiment in a position corresponding to that in FIG. 3.

FIG. 11 illustrates an example of a first wall triply formed and a second wall doubly formed. A first wall 231 includes an inner wall 31A, a middle wall 31C, and an outer wall 31B. The inner wall 31A is located inside the middle wall 31C, and the outer wall 31B is located outside the middle wall 31C. The inner wall 31A, the middle wall 31C, and the outer wall 31B each include a third portion 31c, a first portion 31a, and a fourth portion 31d. The third portion 31c is made of the same material as that of the gate insulating film 12, and the fourth portion 31d is made of the same material as that of the second interlayer insulating film 16. When the first wall 231 does not include a portion made of the same material as that of the first interlayer insulating film 14 in this way, a height of the first wall 231 is preferably increased by layering another insulating layer such that the uncured first alignment film 41 can be suppressed from spreading to the light-transmitting region CR.

On the other hand, a second wall 232 includes an inner wall 32A, and an outer wall 32B surrounding the inner wall 32A outside the inner wall 32A. The inner wall 32A and the outer wall 32B each have circular outer and inner edges in the plan view. The inner wall 32A and the outer wall 32B are made of, for example, the same material as that of the spacer 26.

Figure 12:
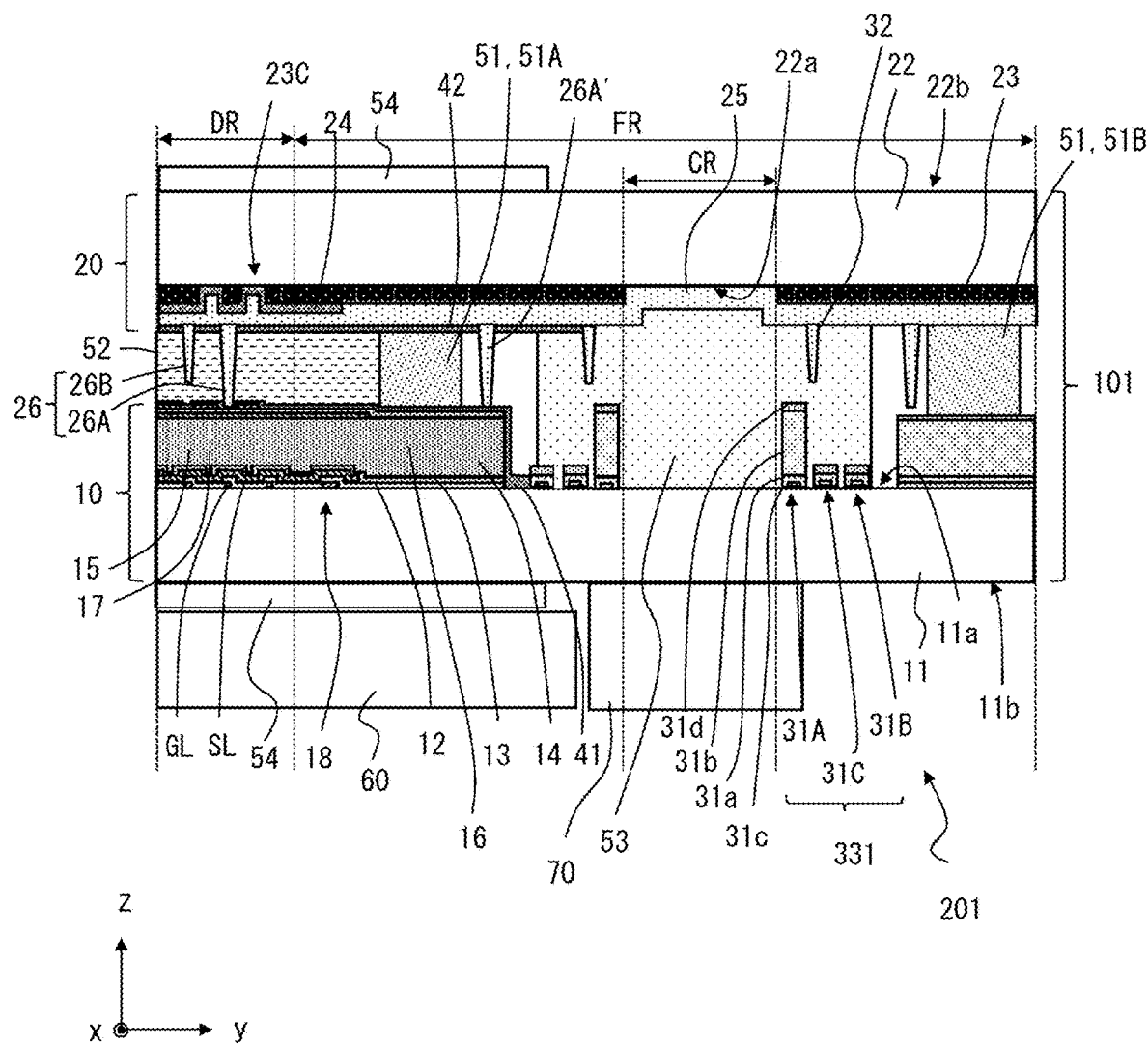
FIG. 12 is a schematic cross-sectional view of an electronic device and a liquid crystal display panel according to another embodiment in a position corresponding to that in FIG. 3.

Further, a part of the first wall multiply formed may have a different height. FIG. 12 illustrates an example of a first wall composed of a plurality of walls having different heights. Similar to the configuration in FIG. 11, a first wall 331 includes an inner wall 31A, a middle wall 31C, and an outer wall 31B. The inner wall 31A includes a third portion 31c, a first portion 31a, a second portion 31b, and a fourth portion 31d.

In contrast, the middle wall 31C and the outer wall 31B include the third portion 31c, the first portion 31a, and the fourth portion 31d. The middle wall 31C and the outer wall 31B do not include the second portion 31b, and thus a height of the inner wall 31A is different from heights of the middle wall 31C and the outer wall 31B. More specifically, the height of the inner wall 31A is greater than the heights of the middle wall 31C and the outer wall 31B.

In the example illustrated in FIG. 12, the height of the middle wall 31C and the height of the outer wall 31B are the same but may be different. Further, the outer wall 31B or the middle wall 31C may be the highest than the other walls.

Similarly, the second wall may have a triple configuration or one or a plurality of the second walls multiply formed may have a height different from that of the other walls. The number of the first walls and the number of the second walls can be arbitrarily determined independently.

Figure 13:
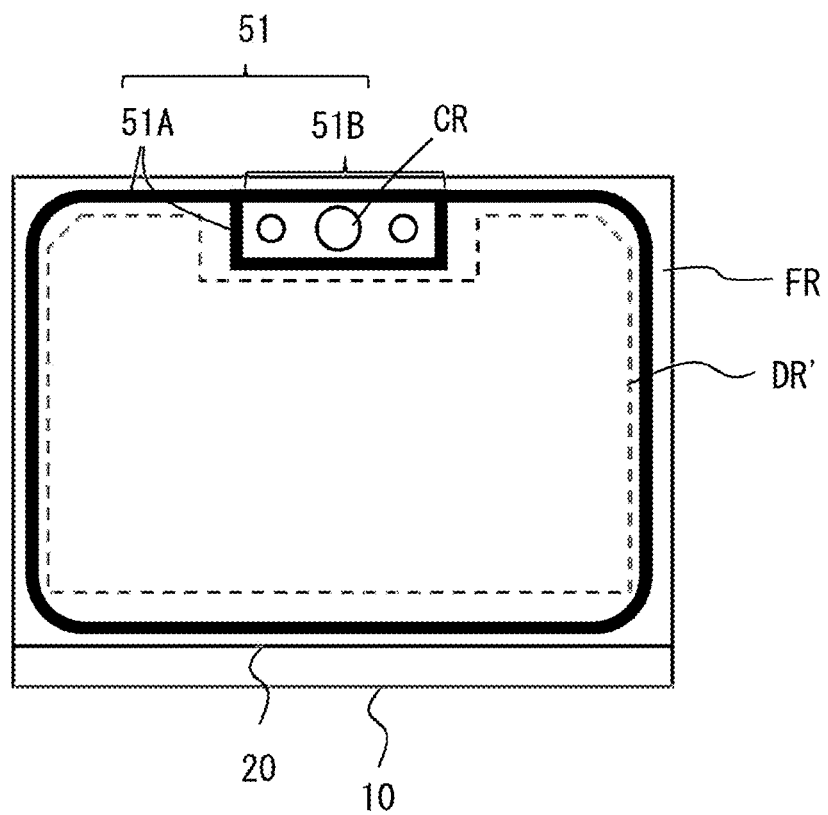
FIG. 13 is a plan view illustrating an example of a liquid crystal display panel including a display region and a seal according to another embodiment.

A shape of the display region DR and a shape of the seal surrounding the liquid crystal layer 52 are not limited to the above-described embodiments. For example, as illustrated in FIG. 13, a display region DR' may have a shape having a rectangular notch on one side of a rectangle. In this case, a first portion 51A surrounds the display region DR', and a second portion is connected to the first portion 51A and surrounds a portion of the non-display region FR including the light-transmitting region CR.

Further, as described in the above-described embodiments, the liquid crystal display panel may be adapted to any driving method of the vertical electrical field mode and the transverse electrical field mode. Thus, positions of the pixel electrode and the common electrode are not limited to those in the above-described embodiments, and the pixel electrode and the common electrode may be disposed in positions suitable for a driving method thereof. For example, the transverse electrical field mode may have a structure in which positions of the common electrode and the pixel electrode are switched, i.e., a structure in which the common electrode is located on the second interlayer insulating film covering the pixel electrode.

The liquid crystal display panel, the electronic device, and the manufacturing method for the liquid crystal display panel according to the disclosure can also be described as follows.

A liquid crystal display panel according to a first configuration includes: an array substrate; a counter substrate; a liquid crystal layer located between the array substrate and the counter substrate; and an alignment film formed on a surface facing the liquid crystal layer in each of the array substrate and the counter substrate. In a plan view, the liquid crystal display panel includes a display region, a non-display region adjacent to the display region, and a light-transmitting region located in the non-display region. At least one of the array substrate or the counter substrate includes a wall portion surrounding the light-transmitting region in the non-display region of the surface facing the liquid crystal layer, and the alignment film is not formed in a range surrounded by the wall portion. According to the first configuration, the wall portion functions as a wall that blocks an uncured material of the alignment film, and thus formation of the alignment film in the light-transmitting region and a decrease in transmittance can be suppressed.

In a second configuration in addition to the first configuration, the wall portion may include a first wall provided on the array substrate and a second wall provided on the counter substrate, the alignment film of the array substrate may be formed in the display region and at least part of the non-display region other than a range surrounded by the first wall, and the alignment film of the counter substrate may be disposed in the display region and at least part of the non-display region other than a range surrounded by the second wall.

In a third configuration in addition to the first configuration, the wall portion may include a first wall provided on the array substrate, the array substrate may include a gate bus line and a source bus line disposed in the display region, a TFT electrically connected to the gate bus line and the source bus line, a pixel electrode electrically connected to the TFT, and a first interlayer insulating film located between the gate bus line and the source bus line and the pixel electrode, and the first wall of the array substrate may include a portion made of a material identical to a material of the first interlayer insulating film.

In a fourth configuration in addition to the first configuration, the wall portion may include a first wall provided on the array substrate, the array substrate may include a gate bus line and a source bus line disposed in the display region, and a gate insulating film located between the gate bus line and the source bus line, and the first wall of the array substrate may include a portion made of a material identical to a material of the gate insulating film.

In a fifth configuration in addition to the first configuration, the wall portion may include a second wall provided on the counter substrate, the counter substrate may include a plurality of spacers disposed in the display region, and the second wall of the counter substrate may be made of a material identical to a material of the plurality of spacers.

In a sixth configuration in addition to the fifth configuration, the plurality of spacers may include a plurality of main spacers and a plurality of sub-spacers having a height lower than a height of the main spacers, and a height of the second wall may be equal to the height of the plurality of sub-spacers.

In a seventh configuration in addition to the first to sixth configurations, in the plan view, an outer shape of the wall portion may have a circular shape or a polygonal shape.

In an eighth configuration in addition to the first to seventh configurations, the wall portion may include an inner wall surrounding the light-transmitting region and an outer wall surrounding the inner wall outside the inner wall.

In a ninth configuration in addition to the eighth configuration, a height of the inner wall may be different from a height of the outer wall.

In a tenth configuration in addition to the first to ninth configurations, the liquid crystal display panel may further include a transparent resin portion disposed in the light-transmitting region between the array substrate and the counter substrate.

In an eleventh configuration in addition to the tenth configuration, the transparent resin portion does not need to be in contact with air in the light-transmitting region between the array substrate and the counter substrate.

In a twelfth configuration in addition to the tenth configuration, the wall portion may be in contact with the transparent resin portion.

In a thirteenth configuration in addition to the second configuration, the counter substrate may further include a color filter, and an overcoat film covering the color filter, and the second wall may be made of a material identical to a material of the overcoat film.

In a fourteenth configuration in addition to the second configuration may include a gap between the first wall and the second wall.

In a fifteenth configuration in addition to the first to fourteenth configurations, the liquid crystal layer does not need to be located in the light-transmitting region.

An electronic device according to a sixteenth configuration includes: the liquid crystal display panel according to any of the configurations 1 to 15; a backlight disposed facing the display region of the array substrate of the liquid crystal display panel; and a camera unit disposed facing the light-transmitting region of the array substrate. According to the sixteenth configuration, the electronic device has the structure in which the alignment film is less likely to be formed in the light-transmitting region, and thus transmittance in the light-transmitting region is increased. Thus, a high-sensitivity camera characteristic is provided.

A manufacturing method for a liquid crystal display panel according to a seventeenth configuration includes: preparing an array substrate including a display region and a non-display region adjacent to the display region and including a light-transmitting region in the non-display region and a first wall surrounding the light-transmitting region; preparing a counter substrate including a display region and a non-display region adjacent to the display region and including a light-transmitting region in the non-display region and a second wall surrounding the light-transmitting region; forming an alignment film outside a range surrounded by the first wall on the array substrate; forming an alignment film outside a range surrounded by the second wall on the counter substrate; and forming a liquid crystal layer between the array substrate and the counter substrate. According to the seventeenth configuration, a wall portion functions as a wall that blocks an uncured material of the alignment film, and thus formation of the alignment film in the light-transmitting region and a decrease in transmittance can be suppressed.

In an eighteenth configuration in addition to the seventeenth configuration, the method for manufacturing a liquid crystal display panel may further include disposing a transparent resin material in the light-transmitting region before forming the liquid crystal layer.

INDUSTRIAL APPLICABILITY

The liquid crystal display panel, the electronic device, and the manufacturing method for the liquid crystal display panel according to the disclosure are applicable to liquid crystal panels and electronic devices for various uses and are suitably used, in particular, for a narrow-frame liquid crystal display panel including a camera and an electronic device including the liquid crystal display panel.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:
1. A liquid crystal display panel, comprising:
an array substrate;
a counter substrate;
a liquid crystal layer located between the array substrate and the counter substrate; and an alignment film formed on a surface facing the liquid crystal layer in each of the array substrate and the counter substrate, wherein in a plan view, the liquid crystal display panel includes a display region, a non-display region adjacent to the display region, and a light-transmitting region located in the non-display region, at least one of the array substrate or the counter substrate includes a wall portion surrounding the light-transmitting region in the non-display region of the surface facing the liquid crystal layer, and the alignment film is not formed in a range surrounded by the wall portion.

2. The liquid crystal display panel according to claim 1, wherein the wall portion includes a first wall provided on the array substrate and a second wall provided on the counter substrate, the alignment film of the array substrate is formed in the display region and at least part of the non-display region other than a range surrounded by the first wall, and the alignment film of the counter substrate is disposed in the display region and at least part of the non-display region other than a range surrounded by the second wall.

3. The liquid crystal display panel according to claim 2, wherein the counter substrate further includes a color filter and an overcoat film covering the color filter, and the second wall is made of a material identical to a material of the overcoat film.

4. The liquid crystal display panel according to claim 2, comprising a gap between the first wall and the second wall.

5. The liquid crystal display panel according to claim 1, wherein the wall portion includes a first wall provided on the array substrate, the array substrate includes a gate bus line and a source bus line disposed in the display region, a TFT electrically connected to the gate bus line and the source bus line, a pixel electrode electrically connected to the TFT, and a first interlayer insulating film located between the gate bus line and the source bus line and the pixel electrode, and the first wall of the array substrate includes a portion made of a material identical to a material of the first interlayer insulating film.

6. The liquid crystal display panel according to claim 1, wherein the wall portion includes a first wall provided on the array substrate, the array substrate includes a gate bus line and a source bus line disposed in the display region and a gate insulating film located between the gate bus line and the source bus line, and the first wall of the array substrate includes a portion made of a material identical to a material of the gate insulating film.

7. The liquid crystal display panel according to claim 1, wherein the wall portion includes a second wall provided on the counter substrate, the counter substrate includes a plurality of spacers disposed in the display region, and the second wall of the counter substrate is made of a material identical to a material of the plurality of spacers.

8. The liquid crystal display panel according to claim 7, wherein the plurality of spacers includes a plurality of main spacers and a plurality of sub-spacers having a height lower than a height of the main spacers, and a height of the second wall is equal to the height of the plurality of sub-spacers.

9. The liquid crystal display panel according to claim 1, wherein in the plan view, an outer shape of the wall portion has a circular shape or a polygonal shape.

10. The liquid crystal display panel according to claim 1, wherein the wall portion includes an inner wall surrounding the light-transmitting region and an outer wall surrounding the inner wall outside the inner wall.

11. The liquid crystal display panel according to claim 10, wherein a height of the inner wall is different from a height of the outer wall.

12. The liquid crystal display panel according to claim 1, further comprising a transparent resin portion disposed in the light-transmitting region between the array substrate and the counter substrate.

13. The liquid crystal display panel according to claim 12, wherein the transparent resin portion is not in contact with air in the light-transmitting region between the array substrate and the counter substrate.

14. The liquid crystal display panel according to claim 12, wherein the wall portion is in contact with the transparent resin portion.

15. The liquid crystal display panel according to claim 1, wherein the liquid crystal layer is not located in the light-transmitting region.

16. An electronic device, comprising:

the liquid crystal display panel according to claim 1;

a backlight disposed facing the display region of the array substrate of the liquid crystal display panel; and a camera unit disposed facing the light-transmitting region of the array substrate.

17. A manufacturing method for a liquid crystal display panel, the manufacturing method comprising:

preparing an array substrate including a display region and a non-display region adjacent to the display region and including a light-transmitting region in the non-display region and a first wall surrounding the light-transmitting region;

preparing a counter substrate including a display region and a non-display region adjacent to the display region and including a light-transmitting region in the non-display region and a second wall surrounding the light-transmitting region;

forming an alignment film outside a range surrounded by the first wall on the array substrate;

forming an alignment film outside a range surrounded by the second wall on the counter substrate; and forming a liquid crystal layer between the array substrate and the counter substrate.

18. The manufacturing method for a liquid crystal display panel according to claim 17, further comprising disposing a transparent resin material in the light-transmitting region before forming the liquid crystal layer.

* * * * *